Sept. 9, 1969 W. E. FLANNERY 3,466,621

CONTINUOUS FILM MAGNETIC MEMORY ARRAY HAVING MATRIX OF ISLAND-LIKE VOIDS

Filed June 22, 1965

INVENTOR
WILLIAM E. FLANNERY

BY Fred Fisher

ATTORNEY

United States Patent Office 3,466,621
Patented Sept. 9, 1969

3,466,621

CONTINUOUS FILM MAGNETIC MEMORY ARRAY HAVING MATRIX OF ISLAND-LIKE VOIDS

William E. Flannery, Norristown, Pa., assignor to Sperry Rand Corporation, New York, N.Y., a corporation of Delaware Filed June 22, 1965, Ser. No. 465,934
Int. Cl. G11b 5/00, 23/00
U.S. Cl. 340—174 9 Claims

ABSTRACT OF THE DISCLOSURE

The invention relates to a memory geometry whereby a continuous magnetic sheet has staggered holes located therein by removing equal amount of magnetic materials from beneath the sense line and cancellation line. The inductance of these lines is therefore more closely balanced. Furthermore, the memory areas are less creep sensitive since there are no etched edges to act as nucleation centers for walls.

This invention relates to magnetic memory arrays, and, in particular, to magnetic memory arrays utilizing planar thin magnetic films.

One type of magnetic memory array of the prior art includes a planar substrate having a plurality of sense and bit lines oriented thereinabove, the lines being arranged orthogonally with word lines to form a matrix. The bit lines are oriented above, and parallel with, the sense lines. Below each of the intersections of the bit and sense lines with the word lines is an elemental area, a dot, a rectangle, or other minor configuration, of magnetic film deposited on the substrate. The magnetic film is anisotropic with its easy magnetic axis oriented parallel to the word line. Information indicative of a 1 or a 0 is written into the magnetic element by magnetizing the film in one direction along the easy axis to represent a 1 and in the other direction along the easy axis to represent a 0. An elemental magnetic film is "destructively" read out by the application of a pulse applied to the appropriate word line. However, prior to the termination of the word line pulse, a "steering" pulse of the proper polarity is applied to the orthogonally disposed bit lines so that the read-out film elements revert to their original magnetic condition. To eliminate erroneous signals, due to inductive and capacitive coupling, earth's magnetic field, "noise," and the like, corresponding bit-cancellation and sense-cancellation lines are oriented adjacent to but spaced away from the bit and sense lines. The sense and cancellation-sense lines are fed into a differential amplifier so that the noise is cancelled during a reading operation. The "steering" pulses are applied to both the bit line and the bit-cancellation line.

When a selected word line is read out a large number of times, a steering pulse is repeatedly applied to the bit lines to steer the read-out film element to its original condition. However, the magnetic film elements associated with the non-selected word lines, ambient with the bit lines, tend to have their magnetization vectors disturbed due to a creep phenomenon associated with domain wall formed along the film element edge and, thus, such film elements show a high disturb sensitivity. The high disturb sensitivity persists even when a ferrite keeper is used, in the manner known to the prior art.

The aforesaid disturb sensitivity is believed to be not directly associated with the demagnetization field, but, however, it is believed, the principal mechanism whereby films creep and lose their stored information is by way of Neél to Block wall transitions. Creep sensitivity therefore requires a high transition probability between wall types and the existence of walls. Bitter pattern domain studies on low power type films show that domains exist at the etched edges of all the various shaped bits. The observed creep sensitivity, therefore, is believed to be due to the etched edges.

Thus it is an object of this invention to provide a novel memory array which avoids the creep due to shape configuration.

Still another object of this invention is to provide a novel magnetic memory array which can be operated more reliably by corresponding devices of the prior art.

It is thus a purpose of this invention to improve memory operating speed through the reduction of the bit current transients which block the sense amplifier at the write portion of the cycle, causing a delay time equivalent to the amplifier recovery time.

It is another object of the invention to decrease the creep sensitivity and thereby increase the bit current margins.

It is a purpose of this invention, that decreased creep sensitivity be provided and that bit current transients be decreased over that provided by other bit geometries used with low power memory array wirings.

In accordance with one embodiment of this invention, a magnetic memory array is provided utilizing a glass substrate continuously coated with a conductive metallic film, such as copper (which acts, in part, as a ground plane), upon which is deposited a continuous sheet of thin magnetic film. Above the sheet, separated by a film of insulation, are a plurality of parellel, interlaced, sense and cancellation-sense lines. A plurality of word lines, parallel to each other, are arranged in an orthogonal relationship with respect to the sense and cancellation-sense lines and separated therefrom by a film of insulation. A plurality of bit and cancellation-bit lines, interlaced, and parallel with respect to one another, are oriented on top of the word lines, orthogonally therewith, separated therefrom by suitable insulations directly above the sense and cancellation-sense lines and corresponding thereto. At the intersections defined by the word lines and the cancellation lines, the magnetic film sheet has an area etched away therefrom. The area can be circular in configuration. Also, similar areas, corresponding in number and shape, intermediate the various word lines immediately below the bit and sense lines are etched away.

Other objects and advantages of this invention, together with its construction and mode of operation, will become more apparent from the following description, when read in conjunction with the accompanying drawing, in which like reference symbols refer to similar components and parts, and in which.

Figure 1:
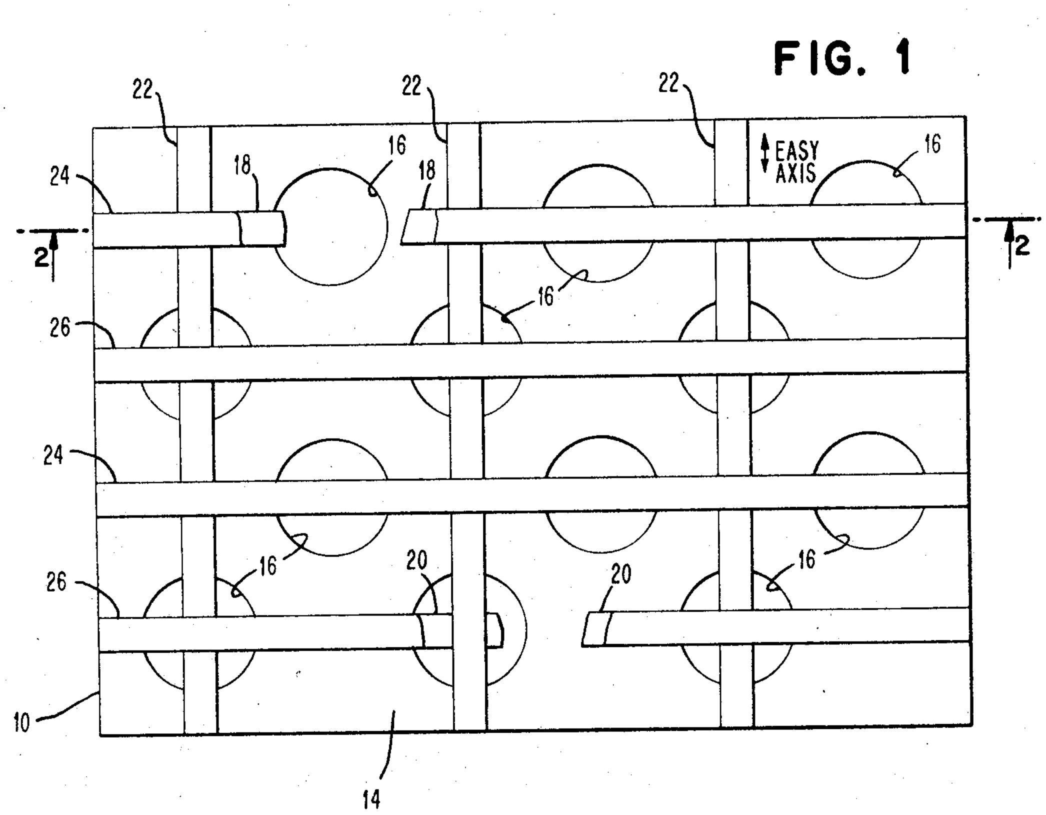
FIG. 1 is a top view of one embodiment of this invention.
Figure 2:
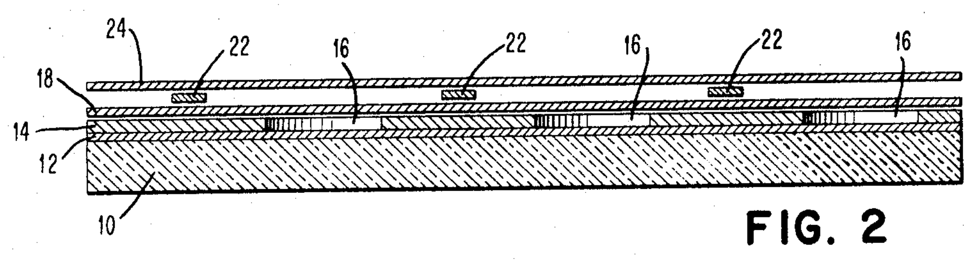
FIG. 2 is a cross-sectional elevational view of the embodiment illustrated in FIG. 1 taken along the lines 2—2 thereof.

Referring to FIGS. 1 and 2, there is shown a glass substrate 10 having continuously deposited thereon a conductive film 12 of copper or other conductive metal which serves as a ground plane. The metallic film 12 is prepared, preferably, by vacuum depositing an initial film of chromium-copper, and building it up to a desired one-half mil thickness with electro-plated copper, the top copper surface then being electro-polished.

A thin continuous magnetic film sheet 14 is deposited on top of the metallic ground plane 12. The magnetic film sheet 14, in a preferred embodiment, has a thickness of 700 angstroms and can be deposited by various methods, for example, electro-plating.

A matrix of elemental areas 16 is etched away from the thin film sheet 14 leaving the non-magnetic copper conductive film 12 therebeneath. The arrangement of the various recessed areas 16 is described in further detail hereinafter.

A continuous coating of an insulation film (not illustrated in the drawing for sake of clarity), such as silicon monoxide, continuously coats the entire substrate including the magnetic film sheet 14 and recessed areas 16.

A plurality of sense lines 18, parallel to each other, are deposited on the insulated substrate surface. The sense lines 18 are aluminum or other suitable conductive metal. A plurality of conductive sense-cancellation lines 20, parallel to each other, are deposited on the substrate interlaced with the sense lines 18. A film of insulation (not shown) is deposited, coating the substrate, encapsulating the sense lines 18 and cancellation-sense lines 20.

A plurality of drive or word lines 22 are deposited on the substrate in an orthogonal relationship with respect to the sense lines 18 and cancellation-sense lines 20. A film of insulation (not shown) covers the entire substrate including the word lines 22.

A plurality of bit lines 24 are deposited onto the substrate coincident with and directly above the corresponding sense lines 18. A plurality of bit-cancellation lines 26 are deposited above and in contiguous relationship with the bit-cancellation lines 20.

The non-magnetic areas 16 are located (a) directly beneath the intersections of the word lines 22 with the corresponding cancellation lines 20, 26, and (b) directly beneath the sense lines 18 intermediate the word lines 22.

Although FIGS. 1 and 2 illustrate three word lines having two bits per word, it is understood, of course, that such is illustrative and that larger memory arrays can be created utilizing many more word lines and more bits per word.

The sense lines and cancellation-sense lines are deposited simultaneously by evaporation through a common mask. Subsequently, the bit and bit-cancellation lines are deposited simultaneously by evaporation through a different common mask.

As in similar prior art devices, the sense lines 18 and sense-cancellation lines 20 are coupled to its respective differential amplifier (not shown). The bit lines 24 and the bit-cancellation lines 26 are coupled to a respective steering network so that, when the information recorded on a magnetic film directly beneath the selector word line and sense lines 18 is read-out, just prior to the termination of the pulse on the word line, a steering pulse is applied to the bit and bit-cancellation lines 24, 26 so that the magnetization vector for that element is rewritten into that location.

The sheet geometry films, as described in accordance with this invention, has substantially fewer walls since there are no etched edges in the immediate vicinity of the intersectional information locations to act as nucleation centers and, thus, are consequently less creep sensitive. It is noted that a simple continuous magnetic sheet cannot be used since the signal from the magnetic film under the dummy bit location would cancel the output signal. The substantially continuous sheet is used with the magnetic material at the dummy bit locations being etched away. The etched edges at the dummy bit locations are far enough away from the switching area that they do not contribute to the creep phenomenon. The magnetic film loading on the bit and sense lines is balanced with respect to the bit-cancellation and sense-cancellation lines to obtain maximum cancellation. The cancelling is achieved with the sheet geometry by etching film areas associated with the sense lines intermediate the word lines. The sheet geometry film is prepared with circular dots etched from the dummy bit locations and equal amounts between the bit locations on the bit lines. The output obtained from the sheet geometry, in accordance with one embodiment, ranges from 1.0 to 1.5 millivolts. The amplitude of the net bit transient (after cancellation) was improved and creep sensitivity was substantially reduced over the prior art devices described above.

Figure 3:
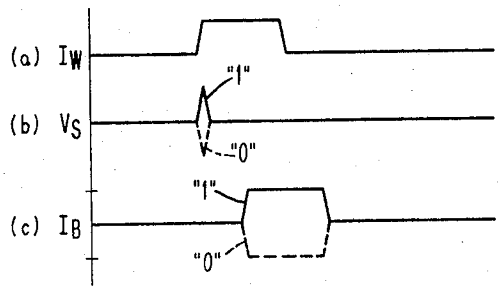
FIG. 3 is a set of waveforms, having the same time base, suitable for understanding the operation of the embodiment illustrated in FIGS. 1 and 2.

The information stored in a magnetic film portion is read out as shown in the timing diagrams of FIG. 3. A pulse of current $I_w$ on the selected word line 22, waveform (a), causes, during its rise time, a voltage pulse $V_s$, waveform (b) to be generated on the sense line 18: a positive pulse for a "1," a negative pulse (illustrated in dotted lines) for a "0." The information obtained from the sense line is rewritten into the bit location during the fall time of the word current pulse, by bracketing the fall time of the word current pulse with a bit current pulse of the proper polarity, as illustrated in waveform (c). As shown by FIG. 3, (c), the bit current pulse rewritten into the bit line during the fall time for the write word pulse is at one polarity for a 1 and at the opposite polarity for a 0.

The noise signals coupled into the sense and sense-cancellation lines, during the transient portions of the read and write operations, are common mode signals and are cancelled in the differential portion of the sense amplifier. There exists two conditions to be considered for such a memory array: First, the unbalance in the bit current transient due to inductive unbalance occurring during the write portion of the cycle; and, second, the creep sensitivity associated with the etched edges (circular and rectangular bit geometries of the prior art). The principal mechanism whereby the films creep and lose their stored information is the so-called Neel-Block-Neel wall transition. Creep sensitivity requires a high transition probability between the wall types and the existence of walls. The films provided in one embodiment of a low power memory array are in the neighborhood of 700 angstroms thick, which is in the thickness range of creep sensitivity. Bitter pattern domain studies on low power type thin films show that domains exist at the etched edges of all the various shaped bits.

This invention thereby provides improvement in both the problem areas discussed above. The essence of this invention is a new bit geometry for a low power memory. The new bit geometry replaces the existing etched magnetic bits with an approximate continuous magnetic sheet.

The bit geometry, described in connection with this invention utilizing removed areas of magnetic film, provides various advantages: For example, first; by removing equal amounts of magnetic material from beneath the sense lines and cancellation lines, the inductance of these lines are more closely balanced, thus providing closer matching of the common mode transients occurring during the write portion of the memory cycle. Second, the approximate sheet geometry films in accordance with the teachings of this invention have substantially fewer walls since there are substantially no etched edges to act as nucleation centers for walls; consequently, they are less creep sensitive. The etched edges of the portions of film removed from beneath the intersection of the word lines and cancellation lines and that removed intermediate the word lines under the sense lines are some distance from the storage area and they do not contribute to the creep phenomenon.

Other modifications will suggest themselves to those skilled in the art. It is, thus desired that this invenion be construed broadly, and be limited solely by the scope of the allowed claims.

The embodiments of the invention in which an exclusive property or privilege is claimed are defined as follows:

1. In combination, a smooth, planar, glass substrate;

a continuous, metallic, copper-containing coating substantially coating one planar surface of said substrate;

a thin, anisotropic, nickel-iron containing, magnetic film continuously deposited on said metallic coating and forming a matrix of circular island-like voids, said voids being staggered with respect to one another;

a continuous insulation coating said substrate including said magnetic film and voids;

a first plurality of parallel disposed, aluminum sense lines evaporated onto the insulated coated substrate; and deposited orthogonal to the easy axis of said film;

a like plurality of parallel disposed, aluminum, cancellation-sense lines, interlaced with said aluminum sense lines, evaporated onto the insulated coated substrate;

additional insulation covering said sense and cancellation-sense lines;

a second plurality of parallel disposed, aluminum, word lines, oriented orthogonally with respect to said sense and cancellation-sense lines, evaporated onto the insulation covered substrate;

insulative material enclosing said word lines;

a third plurality, equal in number to said first plurality, of parallel disposed, aluminum, bit lines, oriented contiguous with corresponding sense lines, evaporated onto the insulated enclosed substrate; and a plurality, equal to said third plurality, of parallel disposed, aluminum, cancellation-bit lines, oriented contiguous with cancellation-sense lines, evaporated onto the insulated enclosed substrate;

and wherein said matrix of voids includes a first pattern of voids oriented beneath the crossovers of said word lines and said cancellation-sense lines, and a second pattern of voids oriented beneath said sense lines intermediate said word lines; and wherein said first pattern is equal in number to said second pattern.

2. A thin, continuous, magnetic film deposited on one side of a substrate and having a matrix of island-like voids, said voids being staggered in any row or column of said matrix;

drive lines positioned over certain ones of said voids arranged in a column.

3. A thin, continuous, anisotropic magnetic film deposited on one side of a substrate and having a matrix of island-like voids, said voids being staggered in any row or column of said matrix;

drive lines positioned over certain ones of said voids arranged in a column.

4. A thin magnetic sheet comprising a magnetic coating deposited on one side of a substrate, said sheet having a plurality of holes therein, said holes being staggered in any row or column;

drive lines positioned over certain ones of said voids arranged in a column, the area between two contiguous holes along said drive line comprising a memory location.

5. A thin anisotropic magnetic sheet comprising;

a magnetic coating deposited on one side of substrate, said sheet having a first plurality of holes oriented in a matrix;

drive lines positioned over certain ones of said holes arranged in a column, the area between two contiguous holes along said drive line comprising a memory location, the anisotrophy of said coating being oriented along said drive line.

6. A thin anisotropic magnetic sheet comprising:

a magnetic coating deposited on one side of a substrate, said sheet having a first plurality of holes oriented in a first matrix and a second plurality of holes oriented in a second matrix, said first and second plurality of holes being staggered with respect to one another;

drive lines positioned in parallel fashion over the holes comprising said first matrix.

7. A thin anisotropic magnetic sheet comprising:

a magnetic coating deposited on one side of a substrate, said sheet having a first plurality of holes oriented in a first matrix aligned with the axis of anisotropy of said sheet and having a second plurality of holes oriented in a second matrix aligned with the axis of anisotropy of said sheet, and wherein said first matrix is interlaced with said second matrix, and wherein said first plurality is equal in number to said second plurality;

respective drive lines positioned over the holes comprising said first matrix.

8. In combination, a substrate;

a thin magnetic film deposited on one planar surface of said substrate in a continuous manner and forming a matrix of island-like voids, said first and second plurality of voids being staggered with respect to one another;

a first plurality of parallel conductors deposted on said substrate, each different one of said conductors being oriented over certain ones of said second plurality of voids;

a second plurality, equal in number and parallel to said first plurality of parallel conductors deposited on said substrate and interlaced with said first plurality of conductors, said second plurality of conductors being oriented over said certain ones of said second plurality of voids;

a third plurality of conductors deposited on said substrate in an orthogonal relationship to said first and second parallel conductors, each different one of said third plurality of conductors being oriented over certain ones of said first plurality of voids.

9. In combination, a substrate;

a thin magnetic film deposited on one planar surface of said substrate in a continuous manner and forming a matrix of island-like voids, said voids being staggered with respect to one another;

a first plurality of parallel sense conductors deposited on said substrate, each different one of said conductors being oriented over certain ones of said voids;

a second plurality of parallel bit conductors deposited on said substrate and interlaced with said first plurality of conductors; and a third plurality of drive conductors deposited on said substrate in an orthogonal relationship to said first and second parallel conductors, each different one of said drive conductors being oriented over different ones of said voids.

References Cited

UNITED STATES PATENTS

| | | |
|---|---|---|
| 2,988,668 | 6/1961 | Lincoln et al. |
| 3,142,047 | 7/1964 | Henderson. |
| 3,144,641 | 8/1964 | Raffel. |
| 3,145,159 | 8/1964 | Berg. |
| 3,191,054 | 6/1965 | Ghisler et al. |
| 3,206,732 | 9/1965 | Briggs. |

STANLEY M. URYNOWICZ, Jr., Primary Examiner